J. F. CULLIN.
ARMATURE INSULATION.
APPLICATION FILED SEPT. 16, 1920.

1,375,133.

Patented Apr. 19, 1921.

WITNESSES:
A. J. Stenner

INVENTOR.
Jasper F. Cullin.
BY
Edward N. Pagelsen,
ATTORNEY.

UNITED STATES PATENT OFFICE.

JASPER F. CULLIN, OF DETROIT, MICHIGAN, ASSIGNOR TO WILLIAM J. HARTWIG, OF DETROIT, MICHIGAN.

ARMATURE INSULATION.

1,375,133.	Specification of Letters Patent.	Patented Apr. 19, 1921.

Application filed September 16, 1920. Serial No. 410,737.

*To all whom it may concern:*

Be it known that I, JASPER F. CULLIN, a citizen of the United States, and residing at Detroit, in the county of Wayne and State of Michigan, have invented a new and Improved Armature Insulation, of which the following is a specification.

This invention relates to means for insulating the bars which constitute the windings of motor armatures from each other and from the metal cores of the armatures, and consists in the details shown in the accompanying drawing and particularly pointed out in the claims.

Figure 1:
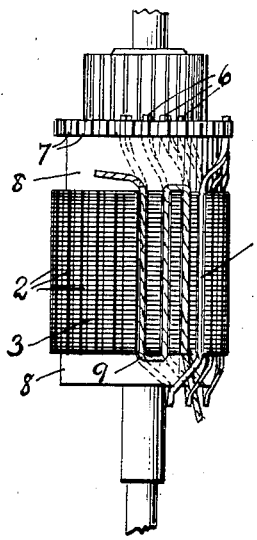

In the drawing, Figure 1 is a plan of an armature showing the method of threading insulation upon the inner bars of the windings. Fig. 2 to Fig. 5 inclusive are diagrammatic views showing the various steps of installing the insulation forming the subject matter of this invention.

Similar reference characters refer to like parts throughout the several views.

The patent to Knight, No. 555,216, dated February 25, 1896, shows the general arrangement of the core and the windings of a motor armature such as forms the basis for the present invention. As in that patent, the outer bar 1 of one winding is forced into the groove 2 in the core 3 against the inner bar 4 of another winding. The two bars in the patent are taped and thus insulated from each other and from the core but taping is very expensive and the present insulation is fully as effective and costs much less.

Figure 2:
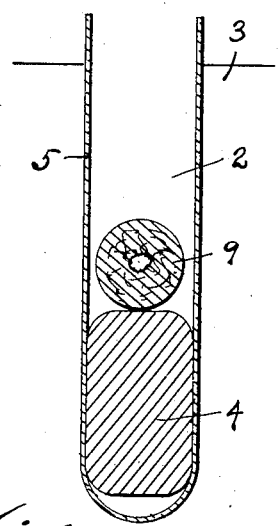
Figure 3:
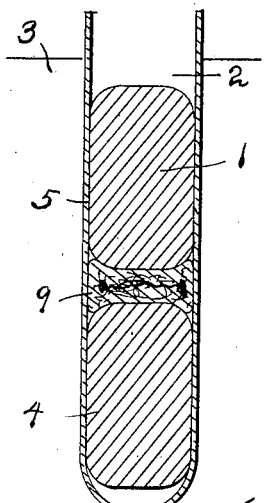
Figure 4:
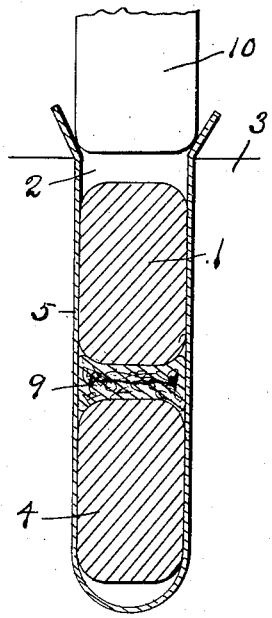

I line the grooves 2 of the core with heavy strong sheet insulation 5, preferably using what is known as "fish paper", and force the inner bars 4 of the windings down into the grooves 2. After all of these bars are in place, and their free ends 6 are in their proper notches 7 in the commutator, a strip 8 of insulation is wrapped around these bars at each end of the core 3. A twisted roll, wick or cord 9 of strong absorbent paper is then threaded into the grooves 2 of the core outside of the bars 4, as shown in Figs. 1 and 2 and the outer bars 1 of the windings are forced down onto this paper which is squeezed down to the shape shown in Figs. 3 to 5.

Figure 5:
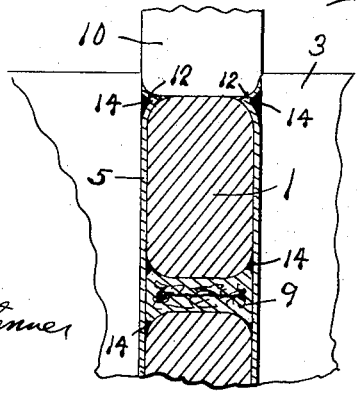

A proper tool 10, whose length is at least that of the core, is then driven into the grooves 2 onto the outer bars 1. The thickness of this tool is preferably a few thousandths of an inch greater than the inside width of the insulated grooves at the cylindrical surface of the core so that the tool and the edges of the grooves 2 will shear the sheet insulation at the outer edges of the grooves. Continued movement of the tool 10 will crimp the edges of the sheet insulation as shown in Fig. 5, which form beads or ribs 12 of sufficient size and strength to hold these outer bars in position after the tool has been removed until the armature is dipped in the usual insulating varnish which flows along in the small passages between the bars and the insulation and in the small passage between the sheet insulation and the faces of the grooves, leaving deposits 14, as shown in Fig. 5. These deposits will prevent the beads or ribs 12 from flattening out.

The cord 9 is absorbent as before stated and becomes saturated with the insulation varnish when the armature is dipped, and when the armature is baked after the dipping this saturated cord is cemented in place and constitutes a holding device for the inner bar and a perfect insulation between the inner and outer bars.

The details and proportions of the various parts may all be changed by those skilled in the art without departing from the spirit of my invention as set forth in the following claims.

I claim:—

1. In an armature for electric machines, a core having longitudinal grooves, thin flexible sheet insulation lining said grooves, armature windings in the form of two superimposed bars in each of said grooves, the outer bars having rounded edges, a twisted roll of absorbent paper compressed between the bars, the outer edges of the sheet insulations being crimped in between the rounded edges of the outer bars and the sides of the grooves, and insulating varnish filling the spaces within the groove and saturating the paper.

2. In an armature for electric machines, a core having longitudinal grooves, thin sheet insulation lining said grooves, armature windings in the form of superimposed bars in each of said grooves, and a twisted cord of absorbent paper threaded into the several grooves and compressed between the bars in each groove.

3. In an armature for electric machines, a core having longitudinal grooves, thin sheet insulation lining said grooves, and armature windings in the grooves, the edges of the sheet insulation being crimped so as to form longitudinal ridges in engagement with the outer edges of the windings to hold the windings in the grooves.

4. In an armature for electric machines, a core having longitudinal grooves, thin sheet insulation lining said grooves, armature windings in the grooves, the edges of the sheet insulation being crimped so as to form longitudinal ridges in engagement with the outer edges of the windings to hold the windings in the grooves, and insulating varnish filling the spaces between the sheet insulation and the faces of the grooves formed by said crimping.

JASPER F. CULLIN.